United States Patent
Choi et al.

(10) Patent No.: US 11,158,327 B2
(45) Date of Patent: Oct. 26, 2021

(54) METHOD FOR SEPARATING SPEECH BASED ON ARTIFICIAL INTELLIGENCE IN VEHICLE AND DEVICE OF THE SAME

(71) Applicant: LG ELECTRONICS INC., Seoul (KR)

(72) Inventors: Hyeonsik Choi, Seoul (KR); Keunsang Lee, Seoul (KR); Jaepil Seo, Seoul (KR); Donghoon Yi, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 144 days.

(21) Appl. No.: 16/593,705

(22) Filed: Oct. 4, 2019

(65) Prior Publication Data
US 2020/0035249 A1 Jan. 30, 2020

(30) Foreign Application Priority Data

Aug. 30, 2019 (KR) ........................ 10-2019-0107800

(51) Int. Cl.
| | | |
|---|---|---|
| *G10L 17/24* | (2013.01) | |
| *G10L 17/18* | (2013.01) | |
| *B60K 35/00* | (2006.01) | |
| *G10L 17/04* | (2013.01) | |
| *G10L 17/00* | (2013.01) | |

(52) U.S. Cl.
CPC .............. *G10L 17/24* (2013.01); *B60K 35/00* (2013.01); *G10L 17/00* (2013.01); *G10L 17/04* (2013.01);
(Continued)

(58) Field of Classification Search
CPC ......... G10L 17/24; G10L 17/00; G10L 17/18; G10L 17/04; G10L 2021/02166;
(Continued)

(56) References Cited

U.S. PATENT DOCUMENTS

| 10,360,905 B1 * | 7/2019 | Pereira ..................... G06F 16/00 |
| 2009/0055178 A1 * | 2/2009 | Coon ........................ G10L 17/00 |
| | | 704/246 |

(Continued)

FOREIGN PATENT DOCUMENTS

| JP | 2017009700 | 1/2017 |
| KR | 1020080009211 | 1/2008 |

(Continued)

OTHER PUBLICATIONS

Korean Intellectual Property Office Application Serial No. 10-2019-0107800, Office Action dated Jan. 22, 2021, 8 pages.

*Primary Examiner* — Huyen X Vo
(74) *Attorney, Agent, or Firm* — Lee, Hong, Degerman, Kang & Waimey

(57) ABSTRACT

Disclosed is a method for separating a speech based on artificial intelligence in a vehicle. The method includes separating a speech signal using at least one sound beamforming or source separation; and performing a speech recognition function by detecting a speaker (user) of the separated signal, and accordingly, other users in the vehicle in addition to a driver may use the speech recognition function. A device and method for separating speech based on artificial intelligence in vehicle of the present disclosure can be associated with artificial intelligence modules, drones (unmanned aerial vehicles (UAVs)), robots, augmented reality (AR) devices, virtual reality (VR) devices, devices related to 5G service, etc.

16 Claims, 16 Drawing Sheets

(52) U.S. Cl.
CPC ........ *G10L 17/18* (2013.01); *B60K 2370/148* (2019.05); *B60K 2370/73* (2019.05)

(58) Field of Classification Search
CPC . G10L 21/0216; G10L 21/0272; B60K 35/00; B60K 37/02; B60K 2370/06; B60K 2370/73; B60K 2370/148; B60K 2370/741; B60K 37/06; G06N 3/08; B60R 16/037; H04L 5/0044; H04L 5/0051; H04L 5/00; H04W 72/0413; H04W 72/04
See application file for complete search history.

(56) References Cited

U.S. PATENT DOCUMENTS

| | | | |
|---|---|---|---|
| 2016/0039356 A1* | 2/2016 | Talwar | H04R 3/005 381/86 |
| 2017/0236512 A1* | 8/2017 | Williams | G06F 16/68 381/79 |
| 2017/0270919 A1* | 9/2017 | Parthasarathi | G10L 15/02 |
| 2017/0349027 A1* | 12/2017 | Goldman-Shenhar | B60H 1/0075 |
| 2019/0073999 A1* | 3/2019 | Premont | G10L 15/08 |
| 2019/0325034 A1* | 10/2019 | Morrison | G06F 16/24578 |
| 2020/0404690 A1* | 12/2020 | Lee | H04W 24/10 |
| 2021/0064965 A1* | 3/2021 | Pardeshi | G06N 3/0454 |

FOREIGN PATENT DOCUMENTS

| | | |
|---|---|---|
| KR | 1020190075017 | 6/2019 |
| KR | 1020190099165 | 8/2019 |

\* cited by examiner

METHOD FOR SEPARATING SPEECH BASED ON ARTIFICIAL INTELLIGENCE IN VEHICLE AND DEVICE OF THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0107800, filed on Aug. 30, 2019, the contents of which are all hereby incorporated by reference herein in their entirety.

BACKGROUND OF THE INVENTION

Field of the Invention

The present disclosure relates to a method and a device for separating a speech based on artificial intelligence in a vehicle, and more particularly to a method and a device for separating a speech based on artificial intelligence in a vehicle, to which multiple agents can be applied in the vehicle.

Related Art

An artificial intelligence system implementing human-level intelligence has been used in various fields. The artificial intelligence system is a system in which a machine performs learning and decision and becomes smart by itself unlike an existing rule-based smart system. As the artificial intelligence system is used more, a recognition rate is improved and a user's taste may be more accurately understood, such that the existing rule-based smart system has been gradually replaced by a deep learning-based artificial intelligence system.

An artificial intelligence technology may include machine learning (for example, deep learning) and element technologies using the machine learning.

The machine learning may include an algorithm technology of classifying/learning features of input data by itself, and the element technology may include a technology of simulating functions such as recognition, decision, and the like, of a human brain using a machine learning algorithm such as deep learning, or the like, and may include technical fields such as linguistic understanding, visual understanding, inference/prediction, knowledge representation, a motion control, and the like.

Various fields to which the artificial intelligence technology may be applied are as follows. The linguistic understanding may refer to a technology of recognizing and applying/processing human languages, and may include natural language processing, machine translation, a dialog system, question and answer, speech recognition/synthesis, or the like. The visual understanding may refer to a technology of recognizing and processing things like human vision, and may include object recognition, object tracking, image search, human recognition, scene understanding, space understanding, image improvement, or the like. The inference/prediction may refer to a technology of deciding and logically inferring and predicting information, and may include knowledge/probability-based inference, optimization prediction, preference-based planning, recommendation, or the like. The knowledge representation may refer to a technology of automating and processing human experience information as knowledge data, and may include knowledge construction (data creation/classification), knowledge management (data utilization), or the like. The motion control may refer to a technology of controlling self-driving of a vehicle and a motion of a robot, and may include a motion control (navigation, collision, driving), a manipulation control (behavior control), or the like.

When it comes to a speech recognition function, if a speech recognition operation is performed in a vehicle, only a driver is focused all the time and thus there is a limitation that the speech recognition function is activated only when the driver utters a wakeup word.

SUMMARY OF THE INVENTION

The present disclosure has been made in consideration of the aforementioned needs and/or the problems.

In addition, the present disclosure is to provide a method and a device for separating a speech based on artificial intelligence in a vehicle that focuses another occupant in addition to a driver when it comes to focusing for speech recognition.

In addition, the present disclosure is to provide a method and a device for separating a speech based on artificial intelligence in a vehicle to thereby reduce speech recognition malfunction caused by noise in the vehicle.

In addition, the present disclosure is to provide a method and a device for separating a speech based on artificial intelligence in a vehicle to thereby generate a model customized for a user and generate preferred service information of the user.

In one general aspect of the present disclosure, there is provided a method for separating a speech based on artificial intelligence, the method including: receiving a speech signal acquired in a vehicle through a microphone; determining as to whether a preset wakeup word is included in the speech, by comparing the speech signal with a signal pattern of the preset wakeup word; when the wakeup word is included in the speech, activating a speech recognition function and forming a cluster of the speech signal; detecting a user corresponding to the cluster of the speech signal; and retrieving user information of the detected user, and generating preferred service information according to the user information, wherein the speech signal is a signal that is separated using at least one of sound beam-forming or source separation The cluster of the speech signal may be a cluster that is deep-clustered using a pre-trained first artificial neural network (ANN) model.

The generating the preference service information may include: inputting the user information into a pre-trained second ANN model; and generating preferred service information of the user according to an output value of the pre-trained second ANN model.

The user information may include a service usage history of the user.

The second ANN model may be an artificial neural network model that is supervised by setting the preference service information of the user as training data.

The second ANN model may assign a weight in proportion of a number of usages of the service based on a service usage history of the user.

The method may further include performing reinforcement learning of the second ANN model, and the reinforcement learning may be learning for assigning a reward to the second ANN model in response to the user's response with respect to the preferred service information.

The method may further include: determining a seat position of the user in the vehicle; and setting a desired directional characteristic of the beamforming according to the determined seat position.

The seat position may be predicted based on a seating signal output from a sensor provided in a seat of the vehicle.

The microphone may be a beamforming microphone.

The method may further include receiving, from a network, downlink control information (DCI) that is used for scheduling transmission of sensing information, which is related to the user, acquired from at least one sensor provided in the vehicle, and the sensing information related to the user may be transmitted to the network based on the CDI.

The method may further include performing an initial access procedure with the network based on a synchronization signal block (SSB), the sensing information related to the user may be transmitted to the network through a physical uplink shared channel (PUSCH), and the SSB and a demodulation reference signal (DM-RS) of the PUSCH may be quasi-co-located (QCL) with respect to QCL type D.

In another general aspect of the present invention, there is provided a method for separating a speech based on artificial intelligence, the method including: acquiring a speech signal in a vehicle through a microphone; determining as to whether a preset wakeup word is included in the speech, by comparing the speech signal with a signal pattern of the preset wakeup word; when the wakeup word is included in the speech, activating a speech recognition function and forming a cluster of the speech signal; detecting a user corresponding to the cluster of the speech signal; and receiving user information of the detected user from an external server, and generating preferred service information according to the user information, wherein the speech signal is a signal that is separated using at least one of sound beam-forming or source separation.

The cluster of the speech signal may be a cluster that is deep-clustered using a pre-learned first artificial neutral network (ANN) model.

The generating the preferred service information may include: inputting the user information into a pre-learned second ANN model; and generating preferred service information of the user according to an output value of the pre-learned second ANN model.

The user information may include a service usage history of the user.

The second ANN model may be a artificial neural network model that is supervised by setting the preference service information of the user as training data.

The second ANN model may assign a weight in proportion of a number of usages of the service based on a service usage history of the user.

The method may further include performing reinforcement learning of the second ANN model; and the reinforcement learning may be learning for assigning a reward to the second ANN model in response to the user's response with respect to the preferred service information.

In yet another general aspect of the present invention, there is provided a device for separating a speech based on artificial intelligence, the apparatus including: a microphone configured to acquire a speech signal in a vehicle; a communication module configured to receive user information from an external server; and a processor configured to determine whether a preset wakeup word is included in the speech by comparing the speech signal with a signal pattern of the preset wakeup word, when the wakeup word is included in the speech, activate a speech recognition function, form a cluster of the speech signal, detect a user corresponding to the cluster of the speech signal, and generate preferred service information according to user information of the detected user, which is received through the communication module, wherein the speech signal is a signal that is separated using at least one of sound beam-forming or source separation.

A method and a device for separating a speech based on artificial intelligence in a vehicle according to an embodiment of the present invention have effects as below.

When it comes to focusing for speech recognition, the present disclosure may focus another occupant in addition to a driver.

In addition, the present disclosure may reduce speech recognition malfunction caused by nose in a vehicle.

In addition, the present disclosure may generate a model customized for a user based on user information, and generate preferred service information of the user.

Effects which may be obtained by the present invention are not limited to the aforementioned effects, and other technical effects not described above may be evidently understood by a person having ordinary skill in the art to which the present invention pertains from the following description.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

The accompanying drawings, included as part of the detailed description in order to help understanding of the present disclosure, provide embodiments of the present disclosure and describe the technical characteristics of the present disclosure along with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
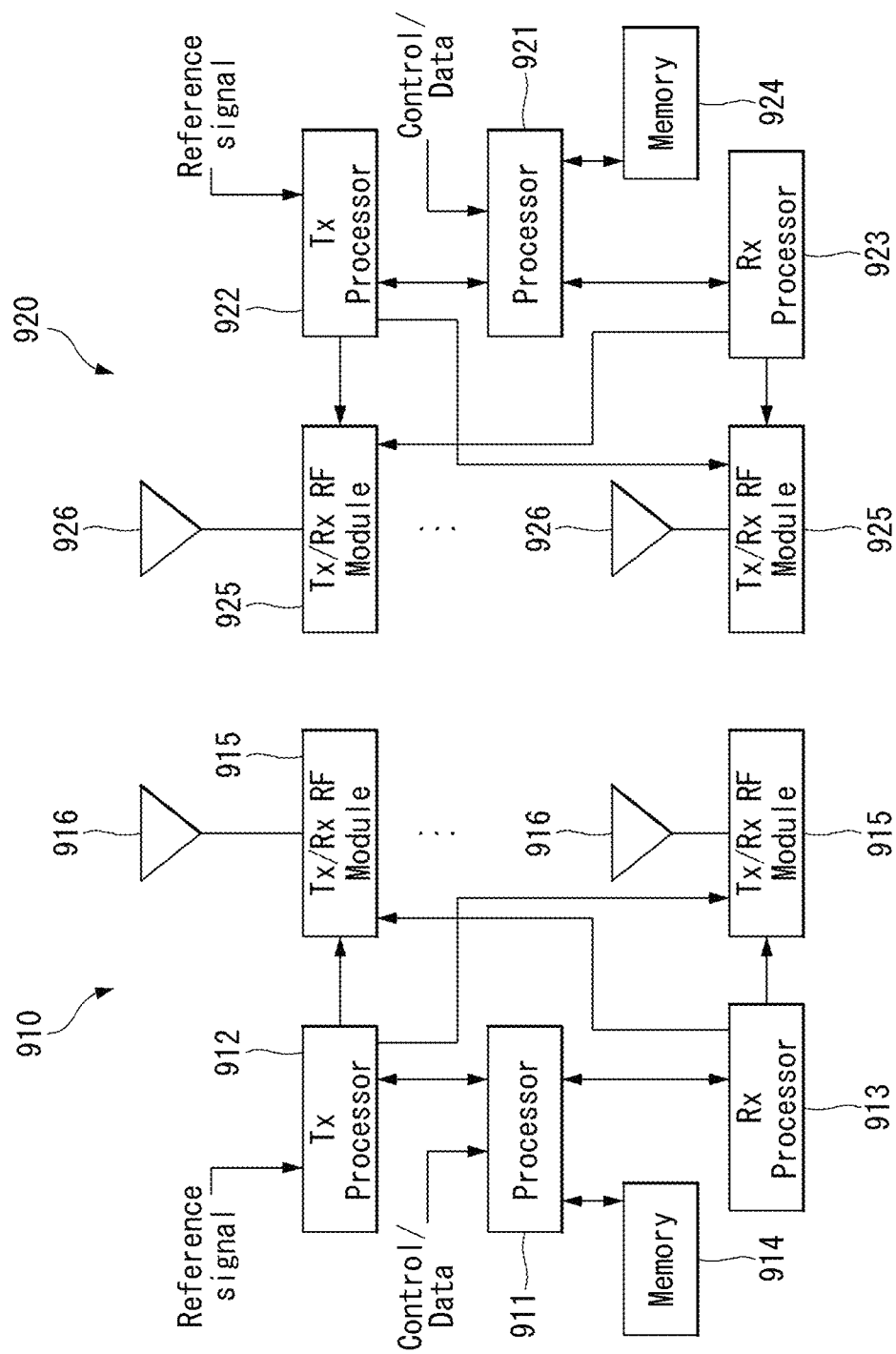
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
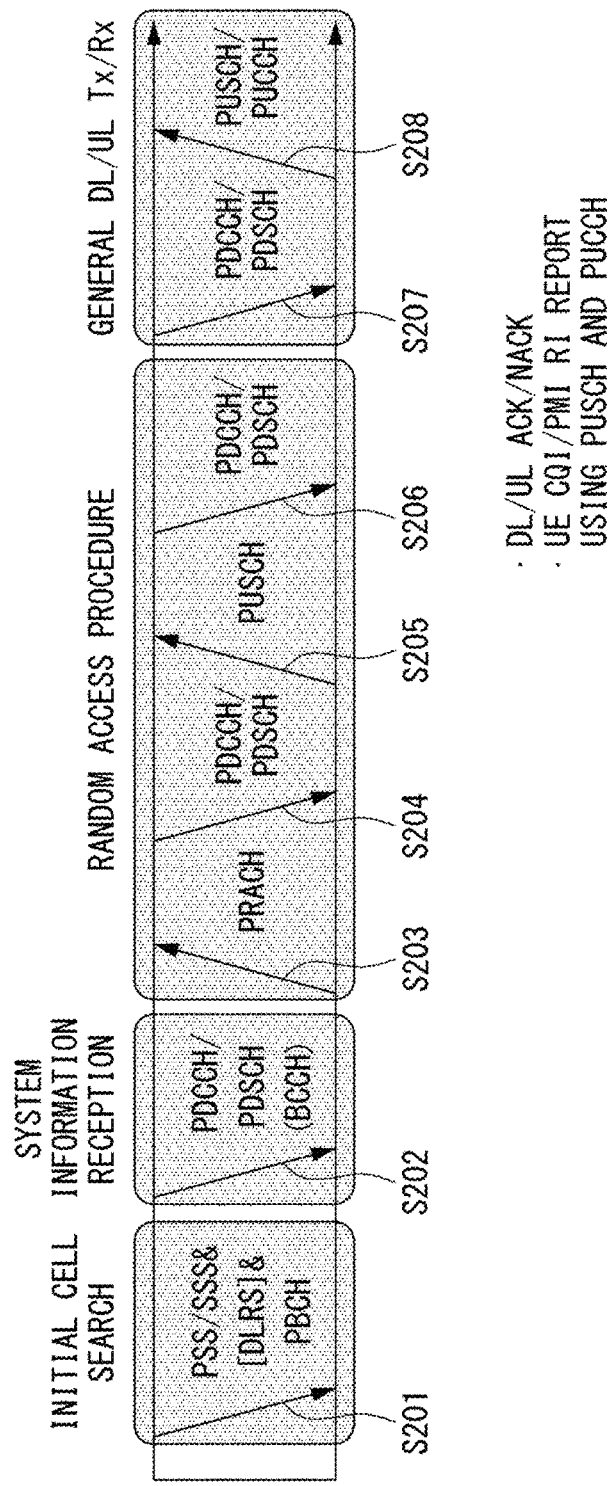
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps 5203 to S206). To this end, the UE can transmit a specific sequence as a preamble through a physical random access channel (PRACH) (S203 and 5205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIGs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ...}. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
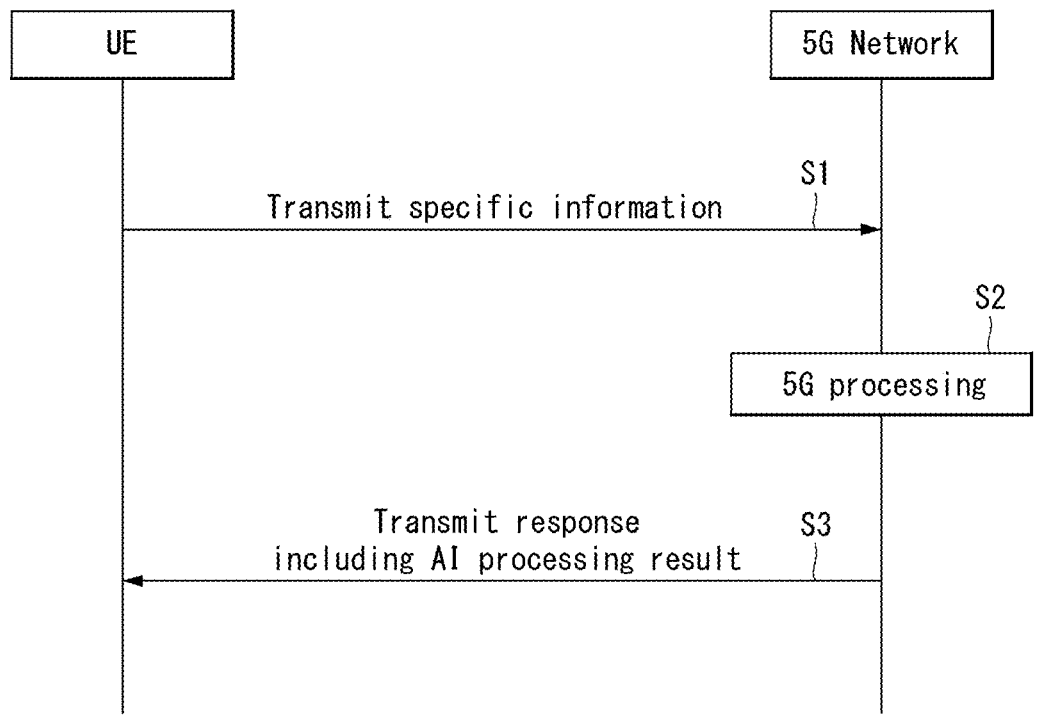
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

In the above description, a description about a User Equipment (UE) may apply to a description of a vehicle provided with reference to FIGS. 4 to 17.

Hereinafter, referring to FIGS. 4 to 17, a vehicle control method and an intelligent computing device for controlling a vehicle according to an embodiment of the present invention will be described in detail.

Figure 4:
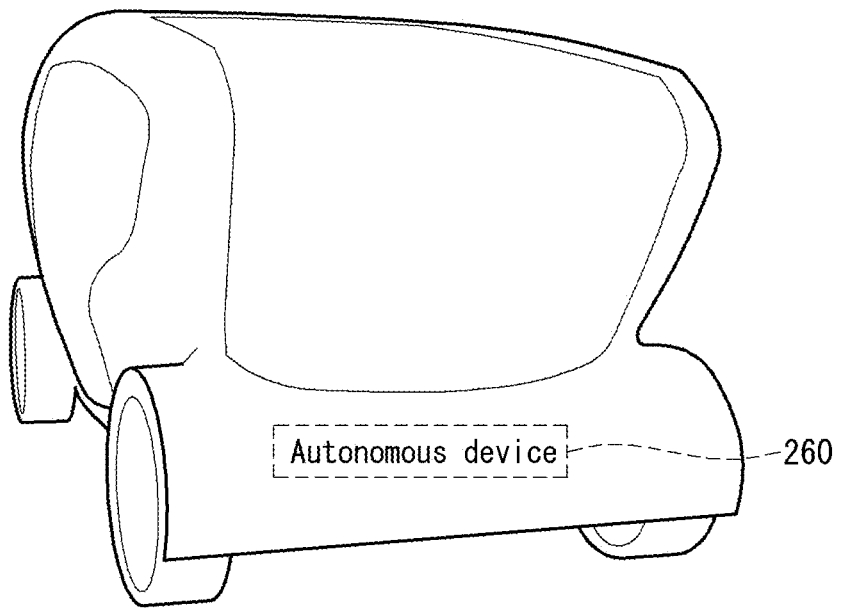
FIG. 4 illustrates a vehicle according to an embodiment of the present disclosure.
Figure 4:
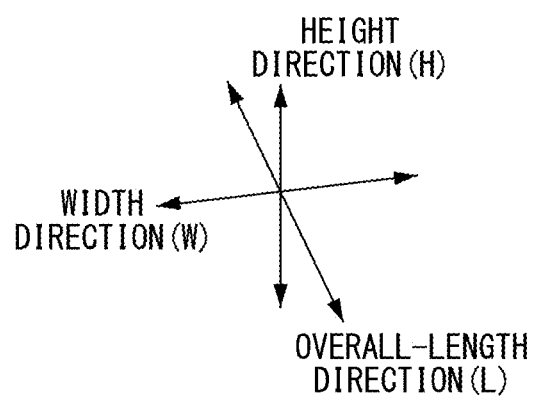

FIG. 4 is a diagram showing a vehicle according to an embodiment of the present disclosure.

Referring to FIG. 4, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

Figure 5:
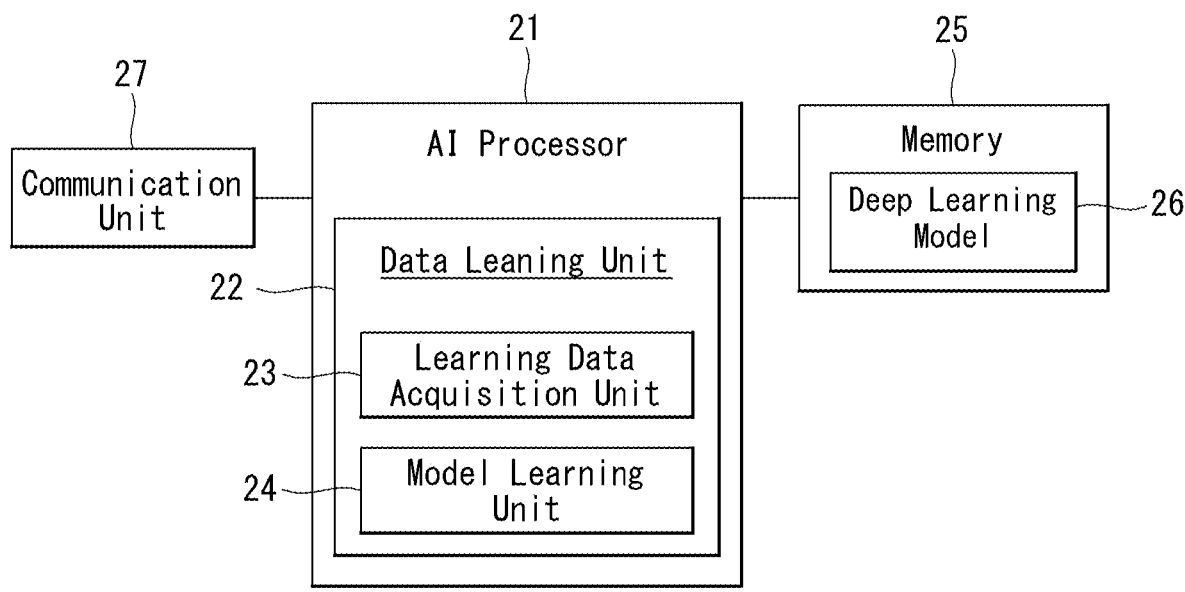
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

Figure 6:
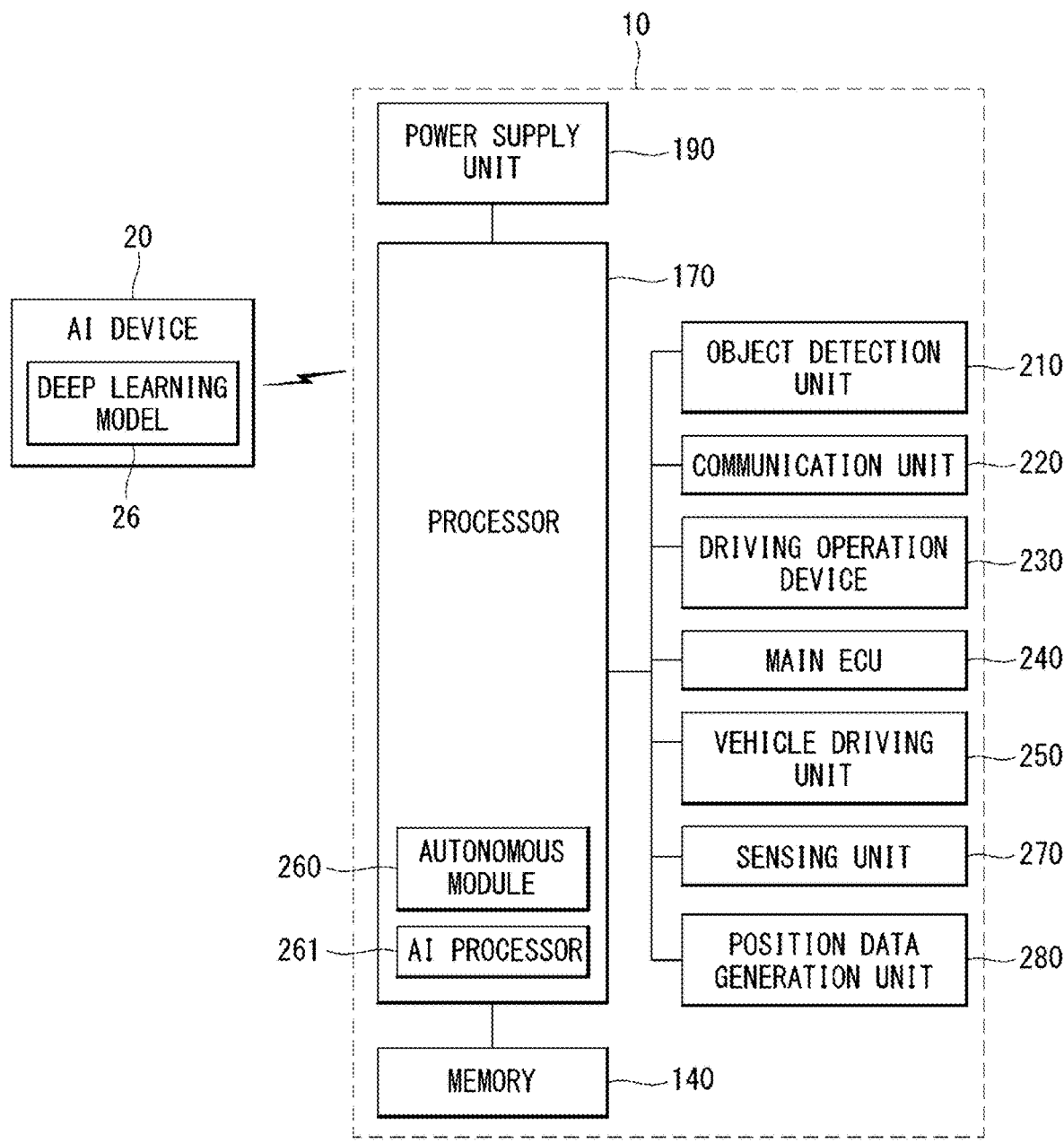
FIG. 6 is a diagram for illustrating a system in which an autonomous vehicle and an AI device according to an embodiment of the present disclosure are linked.

FIG. 6 is a diagram for illustrating a system in which an autonomous vehicle and an AI device according to an embodiment of the present disclosure are linked.

Referring to FIG. 6, an autonomous vehicle 10 can transmit data that require AI processing to an AI device 20 through a communication unit and the AI device 20 including a neural network model 26 can transmit an AI processing result using the neural network model 26 to the autonomous vehicle 10. The description of FIG. 2 can be referred to for the AI device 20.

The autonomous vehicle 10 may include a memory 140, a processor 170, and a power supply 170 and the processor 170 may further include an autonomous module 260 and an AI processor 261. Further, the autonomous vehicle 10 may include an interface that is connected with at least one electronic device included in the vehicle in a wired or wireless manner and can exchange data for autonomous driving control. At least one electronic device connected through the interface may include an object detection unit 210, a communication unit 220, a driving operation unit 230, a main ECU 240, a vehicle driving unit 250, a sensing unit 270, and a position data generation unit 280.

The interface can be configured using at least one of a communication module, a terminal, a pin, a cable, a port, a circuit, an element, and a device.

The memory 140 is electrically connected with the processor 170. The memory 140 can store basic data about units, control data for operation control of units, and input/output data. The memory 140 can store data processed in the processor 170. Hardware-wise, the memory 140 may be configured using at least one of a ROM, a RAM, an EPROM, a flash drive and a hard drive. The memory 140 can store various types of data for the overall operation of the autonomous vehicle 10, such as a program for processing or control of the processor 170. The memory 140 may be integrated with the processor 170. Depending on embodiments, the memory 140 may be classified as a lower configuration of the processor 170.

The power supply 190 can supply power to the autonomous vehicle 10. The power supply 190 can be provided with power from a power source (e.g., a battery) included in the autonomous vehicle 10 and can supply the power to each unit of the autonomous vehicle 10. The power supply 190 can operate according to a control signal supplied from the main ECU 240. The power supply 190 may include a switched-mode power supply (SMPS).

The processor 170 can be electrically connected to the memory 140, the interface 180, and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal, and provide the signal while power is supplied thereto by the power supply 190.

The processor 170 can receive information from other electronic devices included in the autonomous vehicle 10 through the interface. The processor 170 can provide control signals to other electronic devices in the autonomous vehicle 10 through the interface.

The autonomous device 10 may include at least one printed circuit board (PCB). The memory 140, the interface, the power supply 190, and the processor 170 may be electrically connected to the PCB.

Hereafter, other electronic devices connected with the interface and included in the vehicle, the AI processor 261, and the autonomous module 260 will be described in more detail. Hereafter, for the convenience of description, the autonomous vehicle 10 is referred to as a vehicle 10.

First, the object detection unit 210 can generate information on objects outside the vehicle 10. The AI processor 261 can generate at least one of on presence or absence of an object, positional information of the object, information on a distance between the vehicle and the object, and information on a relative speed of the vehicle with respect to the object by applying data acquired through the object detection unit 210 to a neural network model.

The object detection unit 210 may include at least one sensor that can detect objects outside the vehicle 10. The sensor may include at least one of a camera, a radar, a lidar, an ultrasonic sensor, and an infrared sensor. The object detection unit 210 can provide data about an object generated on the basis of a sensing signal generated from a sensor to at least one electronic device included in the vehicle.

Meanwhile, the vehicle 10 transmits the sensing data acquired through at least one sensor to the AI device 20 through the communication unit 220 and the AI device 20 can transmit AI processing data by applying the neural network model 26 to the transmitted data to the vehicle 10. The vehicle 10 recognizes information about the detected object on the basis of the received AI processing data and the autonomous module 260 can perform an autonomous driving control operation using the recognized information.

The communication unit 220 can exchange signals with devices disposed outside the vehicle 10. The communication unit 220 can exchange signals with at least any one of an infrastructure (e.g., a server and a broadcast station), another vehicle, and a terminal. The communication unit 220 may include at least any one of a transmission antenna, a reception antenna, a radio frequency (RF) circuit which can implement various communication protocols, and an RF element in order to perform communication.

It is possible to generate at least one of on presence or absence of an object, positional information of the object, information on a distance between the vehicle and the object, and information on a relative speed of the vehicle with respect to the object by applying data acquired through the object detection unit 210 to a neural network model.

The driving operation unit 230 is a device for receiving user input for driving. In a manual mode, the vehicle 10 may be driven on the basis of a signal provided by the driving operation unit 230. The driving operation unit 230 may include a steering input device (e.g., a steering wheel), an acceleration input device (e.g., an accelerator pedal), and a brake input device (e.g., a brake pedal).

Meanwhile, the AI processor 261, in an autonomous mode, can generate an input signal of the driving operation unit 230 in accordance with a signal for controlling movement of the vehicle according to a driving plan generated through the autonomous module 260.

Meanwhile, the vehicle 10 transmits data for control of the driving operation unit 230 to the AI device 20 through the communication unit 220 and the AI device 20 can transmit AI processing data generated by applying the neural network model 26 to the transmitted data to the vehicle 10. The vehicle 10 can use the input signal of the driving operation unit 230 to control movement of the vehicle on the basis of the received AI processing data.

The main ECU 240 can control the overall operation of at least one electronic device included in the vehicle 10.

The vehicle driving unit 250 is a device for electrically controlling various vehicle driving devices included in the vehicle 10. The vehicle driving unit 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. Meanwhile, the safety device driving control device may include a seatbelt driving control device for seatbelt control.

The vehicle driving unit 250 includes at least one electronic control device (e.g., a control ECU (Electronic Control Unit)).

The vehicle driving unit 250 can control a power train, a steering device, and a brake device on the basis of signals received by the autonomous module 260. The signals received by the autonomous module 260 may be driving control signals that are generated by applying a neural network model to data related to the vehicle in the AI processor 261. The driving control signals may be signals received from the external AI device 20 through the communication unit 220.

The sensing unit 270 can sense a state of the vehicle. The sensing unit 270 may include at least any one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor, and a magnetic sensor.

The AI processor 261 can generate state data of the vehicle by applying a neural network model to sensing data generated by at least one sensor. The AI processing data generated by applying the neural network model may include vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an accelerator pedal, data of a pressure applied to a brake pedal, etc.

The autonomous module 260 can generate a driving control signal on the basis of the AI-processed state data of the vehicle.

Meanwhile, the vehicle 10 transmits the sensing data acquired through at least one sensor to the AI device 20 through the communication unit 22 and the AI device 20 can transmit AI processing data generated by applying the neural network model 26 to the transmitted data to the vehicle 10.

The position data generation unit 280 can generate position data of the vehicle 10. The position data generation unit 280 may include at least any one of a global positioning system (GPS) and a differential global positioning system (DGPS).

The AI processor 261 can generate more accurate position data of the vehicle by applying a neural network model to position data generated by at least one position data generation device.

In accordance with an embodiment, the AI processor 261 can perform deep learning calculation on the basis of at least any one of the internal measurement unit (IMU) of the sensing unit 270 and the camera image of the object detection unit 210 and can correct position data on the basis of the generated AI processing data.

Meanwhile, the vehicle 10 transmits the position data acquired from the position data generation unit 280 to the AI device 20 through the communication unit 220 and the AI device 20 can transmit the AI processing data generated by applying the neural network model 26 to the received position data to the vehicle 10.

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

The autonomous module 260 can generate a route for autonomous driving and a driving plan for driving along the generated route on the basis of the acquired data.

The autonomous module 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring), and TJA (Traffic Jam Assist).

The AI processor 261 can transmit control signals that can perform at least one of the ADAS functions described above to the autonomous module 260 by applying traffic-related information received from at least one sensor included in the vehicle and external devices and information received from another vehicle communicating with the vehicle to a neural network model.

Further, the vehicle 10 transmits at least one data for performing the ADAS functions to the AI device 20 through the communication unit 220 and the AI device 20 can transmit the control signal that can perform the ADAS functions to the vehicle 10 by applying the neural network model 260 to the received data.

The autonomous module 260 can acquire state information of a driver and/or state information of a vehicle through the AI processor 261 and can perform switching from an autonomous mode to a manual driving mode or switching from the manual driving mode to the autonomous mode.

Meanwhile, the vehicle 10 can use AI processing data for passenger support for driving control. For example, as described above, it is possible to check the states of a driver and passengers through at least one sensor included in the vehicle.

Alternatively, the vehicle 10 can recognize voice signals of a driver or passengers, perform a voice processing operation, and perform a voice synthesis operation through the AI processor 261.

5G communication for implementing the vehicle control method according to an embodiment of the present disclosure and schematic contents for performing AI processing by applying the 5G communication and for transmitting/receiving the AI processing result were described above.

In the above, the 5G communication and the 5G communication necessary to implement the vehicle control method according to an embodiment of the present disclosure to perform the AI processing, and transmit and receive the AI processing result has been described.

Figure 7:
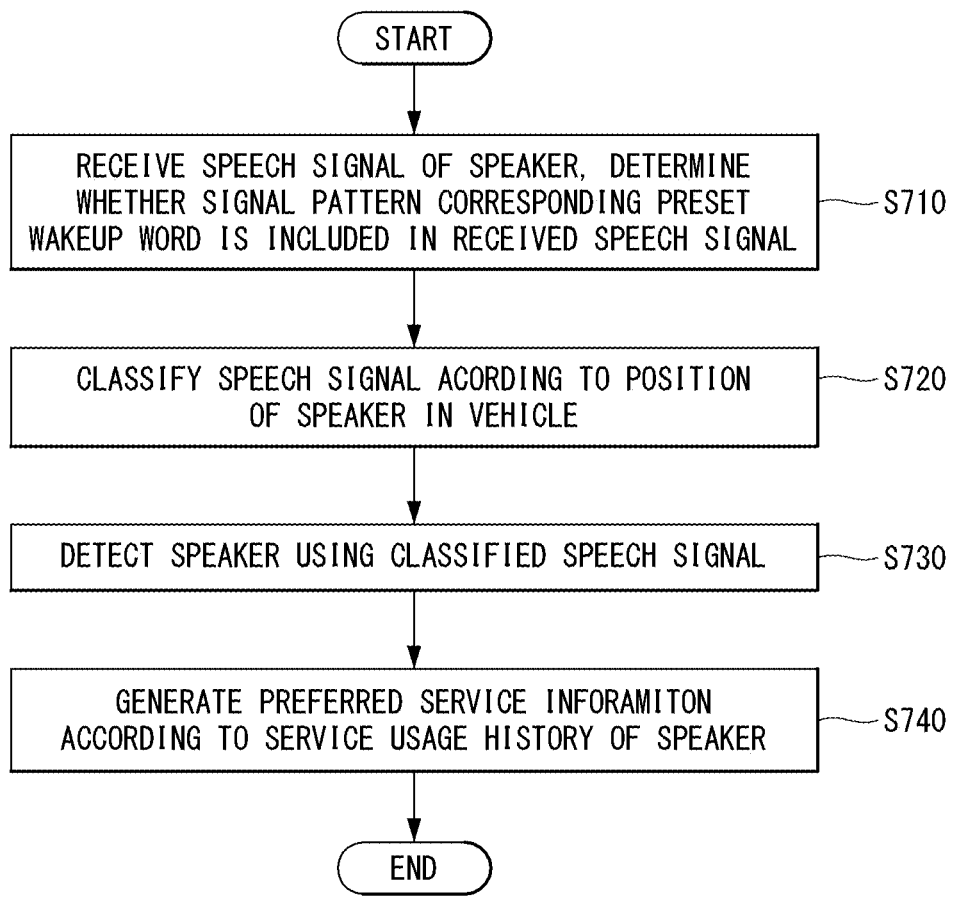
FIG. 7 is a flowchart of a method for separating a speech based on artificial intelligence according to an embodiment of the present invention.

FIG. 7 is a flowchart of a method for separating a speech based on artificial intelligence according to an embodiment of the present invention.

Referring to FIG. 7, a server may receive a speech signal acquired through a microphone provided in a vehicle (S710). The microphone provided in the vehicle may include a first microphone pair disposed at a front seat, and a second microphone pair disposed at a rear seat. The first and second microphone pairs may be referred to as a beam forming microphone. The beam forming microphone may be attached inside the vehicle to thereby minimize influence of ambient noise or interfering sound. The beam forming microphone generally uses two microphones to collect speeches.

The beam forming microphone extracts only a sound-source signal input from a specific direction using a time delay occurring between sound-source signals respectively collected by two microphones. That is, the beam forming microphone processes a signal input from each microphone so that only a sound-source signal input from a preset desired directional characteristic is extracted. In addition, in this case, signal processing may be performed by setting a width of the desired directional characteristic, within which a sound-source signal is extracted about a preset direction, that is, a beam forming area.

The server may classify at least one speech signal received from the vehicle by a position at which the speech information is uttered.

As described above in the step S710, in order to extract only a sound-source signal input from the preset desired directional characteristic through the beam forming microphone, the vehicle may detect an utterance position of a user in advance. The vehicle may set a desired directional characteristic according to the utterance position of the user, and extract a sound-source signal input from the preset desired directional characteristic. In doing so, the vehicle may transmit a speech signal input at a specific position to the server In this case, the speech signal transmitted to the server may be speech information to which information on the position inside the vehicle is tagged. By clustering speech signals received from the vehicle, the server may classify and store speech signals having similar feature information.

The server may input classified speech information to a first artificial neural network (ANN), and detect the user according to an output value (S730).

In the above-described step S720, the server classifies and stores speech signals having similar feature information based on speech information that is extracted by setting a desired directional characteristic with reference to a specific position, and the classified speech signals may be used as input data for the first ANN model.

The first ANN model may be a non-supervised artificial neural network. The first ANN mode, the server may classify the speech signals having the similar feature information according to a speech pattern of utterance and form a cluster. The server may detect a user corresponding to each cluster based on cluster information. In an embodiment of the present disclosure, when user information corresponding to each cluster does not exist in a memory, the server may newly generate user information corresponding to a corresponding cluster.

The server may generate preferred service information according to detected user information (S740).

The server stores user information pre-recorded based on a detected user in the memory. Whenever the detected user uses a service such as executing an application or changing control information of the user with use of a speech recognition function, the server may store a usage history in the memory. That is, the server may store user information including a speech pattern and a service usage history in the memory.

The server may generate preferred service information according to a speech pattern and a service usage history of a user. Specifically, the server may retrieve a pre-stored service usage history of the user according to the speech pattern, and input user information to a pre-trained second ANN model according to the service usage history of the user.

The server may extract a feature value from the user information, input the feature value to the second ANN model, and generate preferred service information of the user according to an output value of the second ANN model. In this case, whenever the user uses a service, the server may analyze a service use pattern of the user with use of a service usage history of every user, and assign a weight to a frequently used service according to the use pattern. That is, whenever the user uses a service, the server may update the second ANN model by analyzing a usage pattern of the service. As a result, the second ANN model may be evolved to be enabled to provide a more customized service to the user as more frequently as the user uses the corresponding service.

Figure 8:
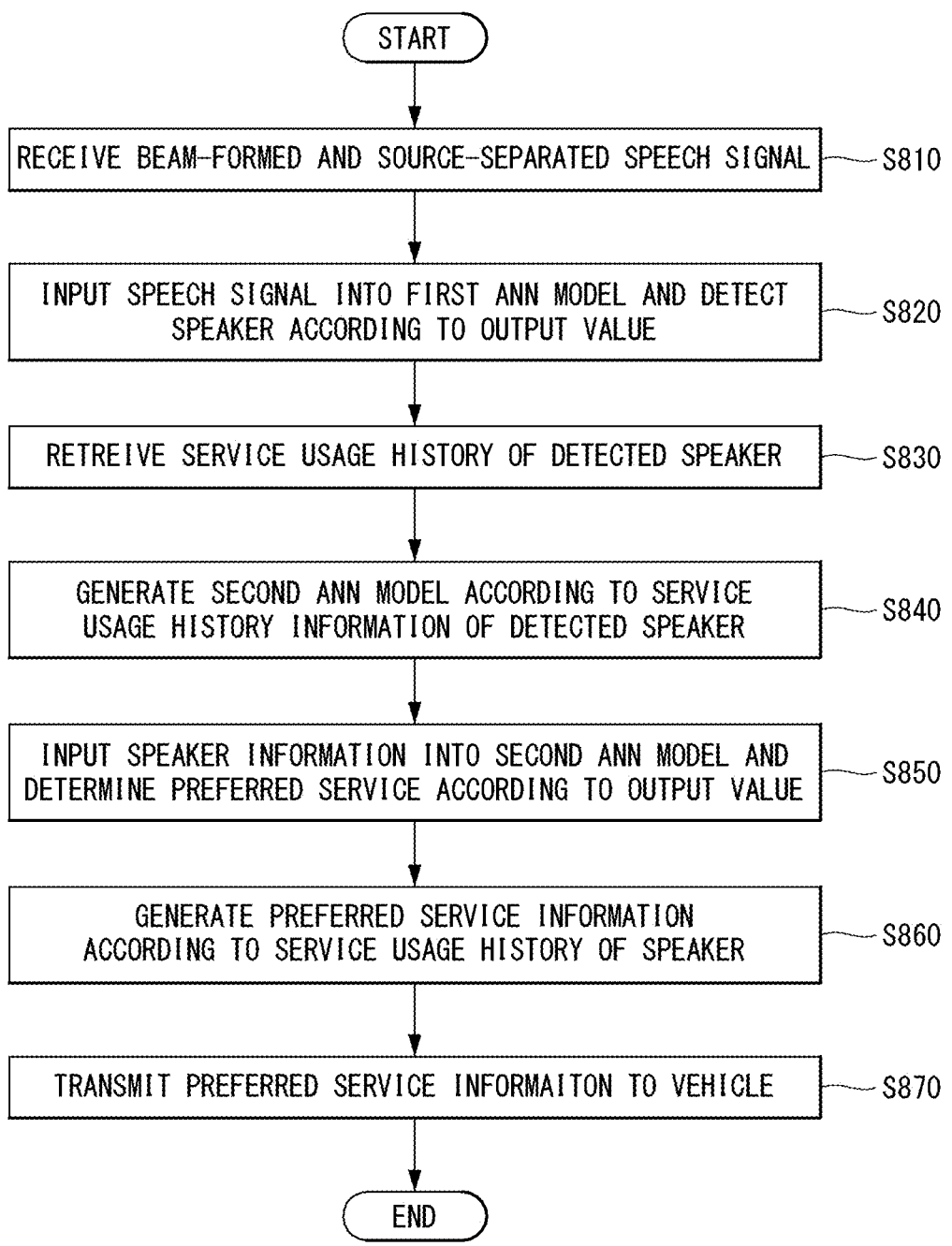
FIG. 8 is a detailed flowchart of the embodiment shown in FIG. 7.

FIG. 8 is a detailed flowchart of the embodiment shown in FIG. 7.

Referring to FIG. 8, the server may receive a beam-formed and source-separated speech signal from the vehicle (S810).

As described above, when there is multiple occupants in the vehicle and the multiple occupants utter at the same time, a speech signal received at a microphone may be a mixed signal and thus a success rate of speech recognition may be degraded. Accordingly, the server may receive, from the vehicle, a speech signal that is beam formed and source separated by a processor of the vehicle.

The server may input the received speech signal to the first ANN model, and detect a user according to an output value of the first ANN model (S820).

The first ANN model may be a non-supervised artificial neural network. Using the first ANN model, the server may classify speech signals having similar feature information according to a speech pattern of utterance and form a cluster. The server may detect a user corresponding to each cluster based on cluster information. In an embodiment of the present disclosure, when user information corresponding to each cluster does not exist in the memory, the server may newly generate user information corresponding to a corresponding cluster.

The server may retrieve a service usage history of the detected user (S830).

The server stores user information pre-recorded based on a detected user in the memory. Whenever the detected user uses a service such as executing an application or changing control information of the user with use of a speech recognition function, the server may store a usage history in the memory. Specifically, the server may retrieve a pre-stored service usage history of the user according to a speech pattern of the user, and train the second ANN model according to the service usage history of the user.

The server may generate the second ANN model according to the service usage history of the detected user (S840).

Specifically, the server may retrieve a pre-stored service usage history according to a speech pattern of the user, and generate the second ANN model in advance according to the service usage history of the user. Specifically, whenever the user uses a service, the server may analyze a service use pattern of the user with use of a service usage history of the user, and assign a weight to a frequently used service according to the use pattern. That is, whenever the user uses a service, the server may update the second ANN model by analyzing a usage pattern of the service. As a result, the second ANN model may be evolved to be enabled to provide a more customized service to the user as more frequently as the user uses the corresponding service.

The server may input user information to the second ANN model, and generate preferred service information according to an output value of the second ANN model (S850).

For example, if a first user inputs a speech signal including a wakeup word and a command, for example, "Hi GL, turn on the air conditioner", into a microphone, the server may detect the first user by analyzing a speech pattern and input first user information to the second ANN model. As a result, the server may infer in-vehicle temperature preferred by the first user according to an output value of the second ANN model, and generate a signal for controlling a desired temperature and wind speed of the air conditioner.

The server may determine a preferred service according to the service usage history of the user, and generate preferred service information (S860 and S870).

In this case, a service may include an air conditioner temperature control service, a news service, a road guide service, a call service, a radio service, etc., but aspects of the present disclosure are not limited thereto. The preferred service information may include list information indicating a plurality services arranged by preference of the user. The preferred service information may include the user's usage pattern of a specific service.

For example, when the first user inputs a speech signal including a wakeup word and a command, for example, "Hi LG, turn on the air conditioner, into a microphone, the server may detect the first user by analyzing a speech pattern and input the first user information to the second ANN model. As a result, the vehicle may infer in-vehicle temperature preferred by the first user according to an output value of the second ANN model, and generate a signal for controlling desired temperature and wind speed of the air conditioner.

Figure 9:
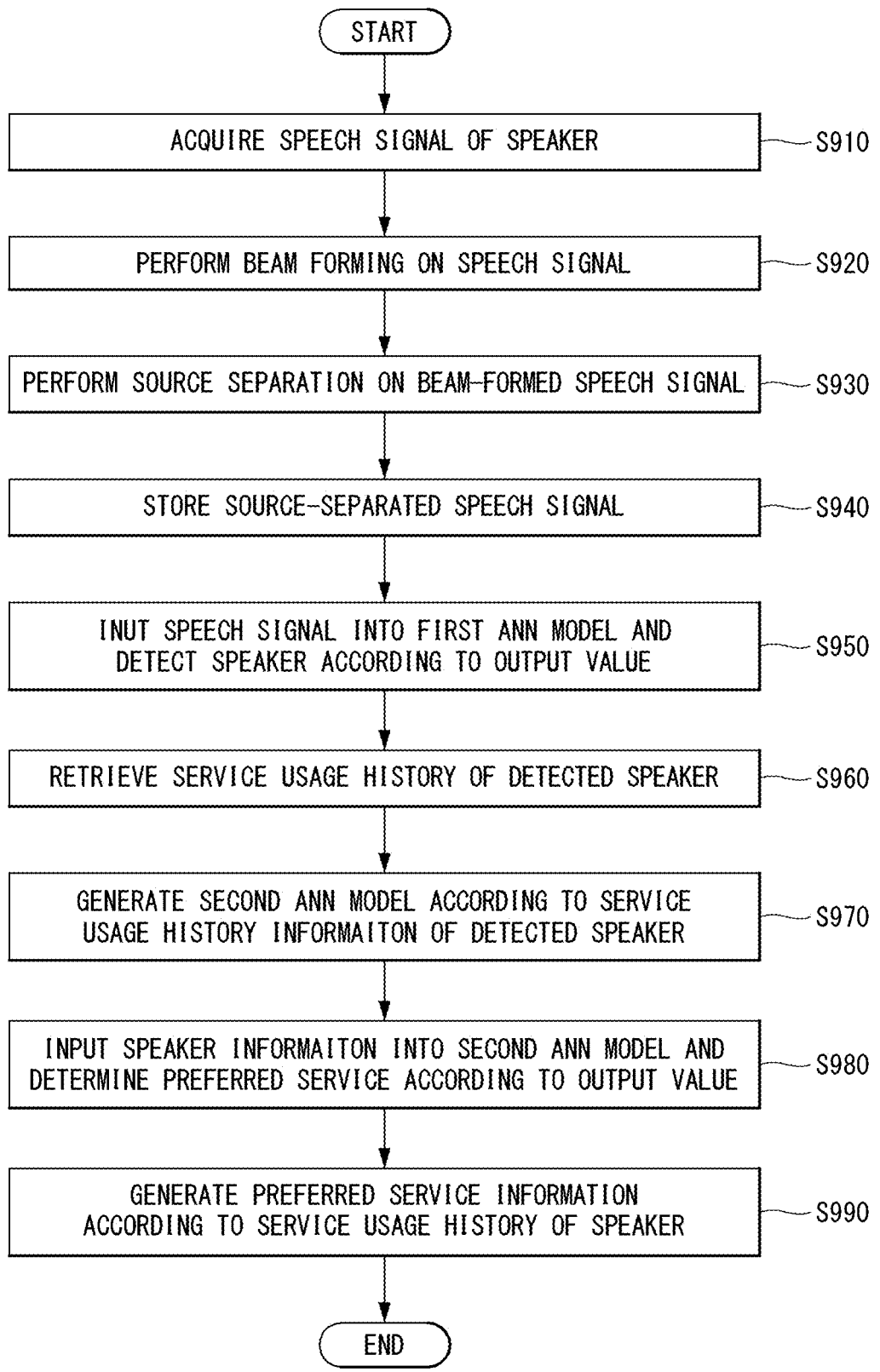
FIG. 9 is a flowchart of a method for separating a speech based on artificial intelligence according to another embodiment of the present disclosure.

FIG. 9 is a flowchart of a method for separating a speech based on artificial intelligence according to another embodiment of the present disclosure.

The vehicle may acquire a speech signal of a user through a microphone (S910).

The vehicle may perform beamforming on the speech signal (S920).

As described above, the microphone provided in the vehicle may include a first microphone pair disposed at a front seat, and a second microphone pair disposed at a rear seat. The first and second microphone pairs may be referred to as a beam forming microphone. The beam forming microphone may be attached inside the vehicle to thereby minimize influence of ambient noise or interfering sound. The beam forming microphone generally uses two microphones to collect speeches.

The beam forming microphone extracts only a sound-source signal input from a specific direction using a time delay occurring between sound-source signals respectively collected by two microphones. That is, the beam forming microphone processes a signal input from each microphone so that only a sound-source signal input from a preset desired directional characteristic is extracted. In addition, in this case, signal processing may be performed by setting a width of a desired directional characteristic, within which a sound-source signal is extracted about a preset direction, that is, a beam forming area.

In a beamforming processing method according to an embodiment of the present invention, the vehicle may determine a position of a user. In order to set a desired directional characteristic of beamforming, the vehicle may determine a seat position inside the vehicle and set the desired directional characteristic of beamforming according to the determined seat position. Specifically, the vehicle may predict a seat where the user is sitting, through a seating signal output from a sensor output from the seat in the vehicle. Based on the seating signal, the vehicle may detect at least one occupant sitting in the vehicle. When one of the at least one occupant utters a speech including a wakeup word, the vehicle may activate a speech recognition function. In this case, based on position information of the at least one occupant which is determined based on the seating signal, the vehicle may set a desired directional characteristic of beamforming.

As such, by extracting a speech signal received from a specific direction according to a desired directional characteristic that is set based on position information of an occupant, the vehicle may remove noise unnecessary for precision of the speech recognition function.

Accordingly, the first microphone pair provided in a front surface of the vehicle may acquire a user occupant in the front side of the vehicle, and the second microphone pair provided in the rear surface of the vehicle may acquire a speech signal of a user occupant in the rear side of the vehicle.

The vehicle may perform source separation on the beamformed speech signal (S930).

The vehicle may perform source separation on the speech signals acquired from the first and second microphone pairs, and store a result of the source separation in the memory. For example, the first microphone pair may acquire a speech signal of an occupant at a driver seat and a front passenger seat. Despite a beamforming process, the speech signal acquired through the first microphone pair may be a mixed signal in which a speech signal of a first user at the driver seat and a speech signal of a second user at a front passenger seat are acquired. Accordingly, the vehicle needs to separate the mixed signal into the speech signal of the first user and the speech signal of the second user and thereby increase a success rate of speech recognition.

To address the aforementioned problem, the vehicle may separate the speech signal of the first user and the speech signal of the second user through the source separation process. The vehicle may separate a sound-source signal by a blind source separation technique, but aspects of the present disclosure are not limited thereto. Through the source separation, the vehicle may recognize the speech signal of the first user and the speech signal of the second user separately, and accordingly, a success rate of speech recognition may significantly increase compared to the case of using merely a beamforming microphone.

The vehicle may store the source-separated speech signal in the memory (S940).

The vehicle may input the speech signal into the first ANN model, and detect a user according to an output value of the first ANN mode.

The first ANN model may be a non-supervised artificial neural network. The first ANN mode, the server may classify the speech signals having the similar feature information according to a speech pattern of utterance and form a cluster. The server may detect a user corresponding to each cluster based on cluster information. In an embodiment of the present disclosure, when user information corresponding to each cluster does not exist in a memory, the server may newly generate user information corresponding to a corresponding cluster.

The vehicle may retrieve a service usage history of the detected user (S960).

The server stores user information pre-recorded based on a detected user in the memory. Whenever the detected user uses a service such as executing an application or changing control information of the user with use of a speech recognition function, the server may store a usage history in the memory. That is, the server may store user information including a speech pattern and a service usage history in the memory. Specifically, the server may retrieve a pre-stored service usage history of the user according to a speech pattern of the user, and train the second ANN model according to the service usage history of the user.

The vehicle may generate the second ANN model according to the service usage history information of the detected user (S970).

Specifically, the server may retrieve a pre-stored service usage history according to a speech pattern of the user, and generate the second ANN model in advance according to the service usage history of the user. Specifically, whenever the user uses a service, the server may analyze a service use pattern of the user with use of a service usage history of the user, and assign a weight to a frequently used service according to the use pattern. That is, whenever the user uses a service, the server may update the second ANN model by analyzing a usage pattern of the service. As a result, the second ANN model may be evolved to be enabled to provide a more customized service to the user as more frequently as the user uses the corresponding service.

The vehicle may input user information into the second ANN model, determine a service according to an output value of the second ANN model, and generate preferred service information according to a result of the determination (S980 and S990).

In this case, a service may include an air conditioner temperature control service, a news service, a road guide service, a call service, a radio service, etc., but aspects of the present disclosure are not limited thereto. The preferred service information may include list information indicating a plurality services arranged by preference of the user. The preferred service information may include a usage pattern of a specific service by the user.

For example, if a first user inputs a speech signal including a wakeup word and a command, for example, "Hi GL, turn on the air conditioner", into a microphone, the server may detect the first user by analyzing a speech pattern and input first user information to the second ANN model. As a result, the server may infer in-vehicle temperature preferred by the first user according to an output value of the second ANN model, and generate a signal for controlling a desired temperature and a wind speed of the air conditioner.

Figure 10:
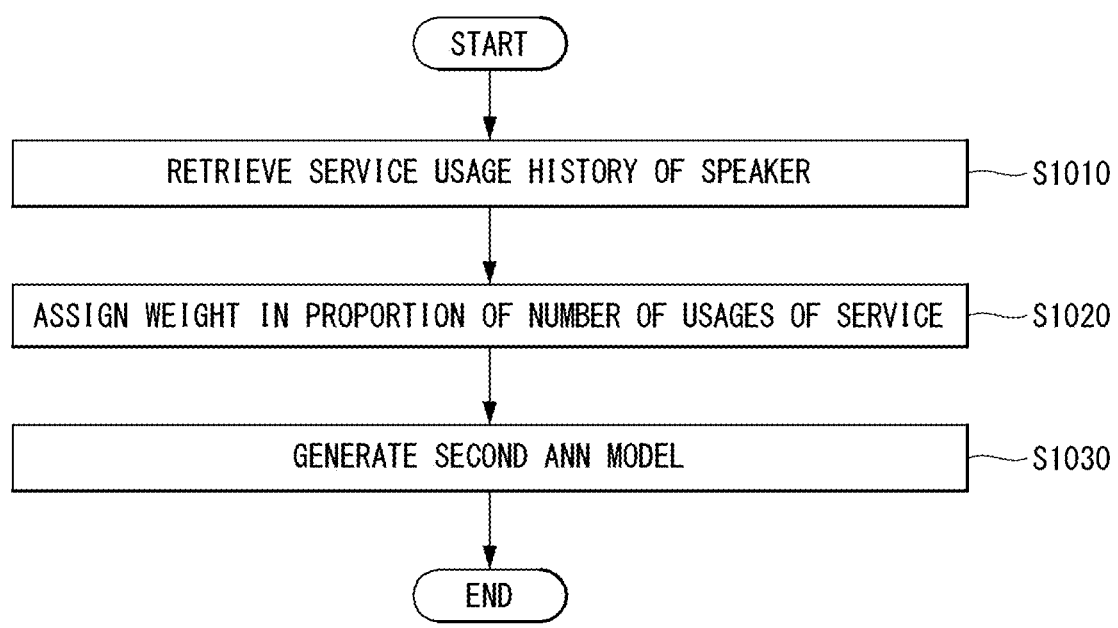
FIG. 10 is a flowchart of a step of generating the second ANN model shown in FIG. 8.

FIG. 10 is a flowchart of a step of generating the second ANN model shown in FIG. 8.

As described above, an AI module may be positioned in a server, a 5G network, or the vehicle. Accordingly, the first and second ANN modules may be also stored in the server, the 5G network or the memory provided in the vehicle. In addition, the AI module may be embedded in an autonomous driving module of the vehicle.

Hereinafter, a step of generating a second ANN model in FIG. 10 relates to a method for generating a second ANN model stored in the server, the 5G network or the memory of the AI module provided in the vehicle, and the processor described later on in FIG. 10 may refer to the server or the processor of the vehicle.

Referring to FIG. 10, the processor may retrieve a service usage history of a user (S1010).

Whenever the user executes a specific service inside the vehicle through a speech recognition function, the processor may store a service usage history in the memory. As a result, the processor may store information regarding a time, a position, and a service content in the memory. The processor may retrieve a pre-stored service usage history in the step of generating a second ANN model to thereby use the retrieved service usage history to generate or train the second ANN model.

The processor may assign a weight in proportion of the number of usages of a service (S1020).

The processor may assign a greater weight to a service more frequently used by the user. For example, a greater weight may be set in proportion of the number of usages of a service by the user. In addition, in an embodiment of the present disclosure, when training the second ANN model, the processor may use a user's reaction or a reward for preferred service information determined according to an output value of the second ANN model, in addition to the number of usages of the service by the user.

The processor may generate the second ANN model by training the second ANN model according to the weight assigned in the step S1020 (S1030).

FIGS. 11 to 14 are examples of implementing a method for separating a speech based on artificial intelligence according to an embodiment of the present disclosure.

Figure 11:
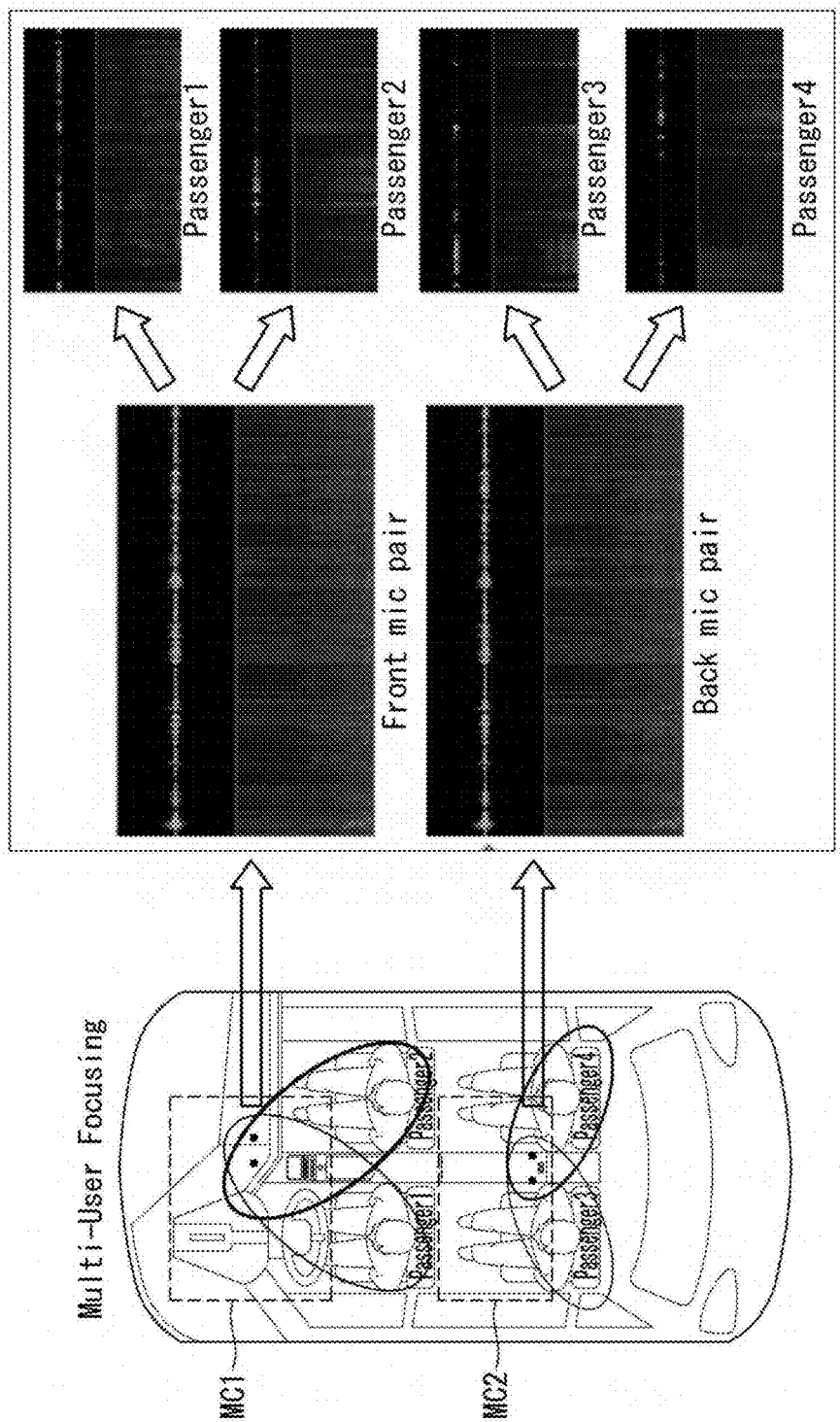
FIGS. 11 to 14 are examples of implementing a method for separating a speech based on artificial intelligence according to an embodiment of the present disclosure.

Referring to FIG. 11, a vehicle may include a first microphone pair MC1 and a second microphone pair MC2. Inside the vehicle shown in FIG. 11, there are a first occupant, a second occupant, a third occupant, and a fourth occupant. The first microphone pair is a beamformed microphone focusing on seats of the first and second occupants, and the second microphone pair is a beamformed microphone focusing on seats of the third and fourth occupants.

When the first to fourth occupants utter at the same time, the first and second microphone pairs MC1 and MC2 may acquire speech signals of users. Although the first to fourth occupants utter at the same time, speech signals of the first and second occupants may be received through the first microphone pair and speech signals of the third and fourth occupants may be received through the second microphone pair. As a result, the processor may acquire a first mixed signal acquired through the first microphone pair, and a second mixed signal acquired through the second microphone pair.

The processor may perform source separation processing so as to separate the speech signals of the first and second occupants and the speech signals of the third and fourth occupants signal from the first mixed signal and the second mixed signal. In this case, the source separation processing method may employ a well-known BSS, but aspects of the present disclosure are not limited thereto. As a result of the source separation processing, the first and second mixed signals may be separated into the speech signals of the first occupant, the second occupant, the third occupant, and the fourth occupant, respectively.

As such, as the vehicle and/or an external server separates a speech signal of at least one user occupant in the vehicle through the method for separating a speech, a speech signal of each user may be acquired accurately and accuracy of speech recognition may be enhanced.

Figure 12:
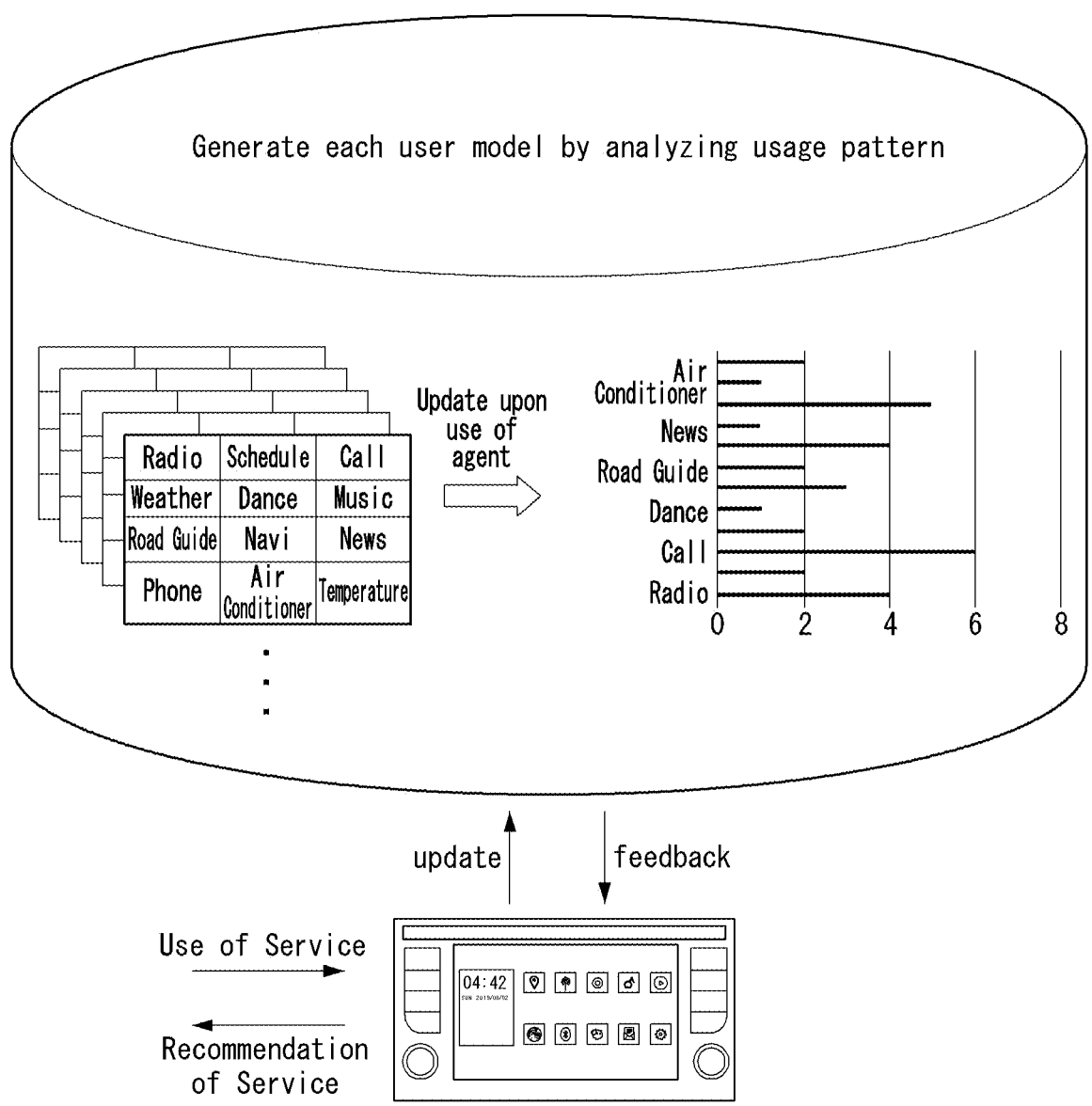

FIG. 12 shows an example of a method of generating a second ANN model. For example, a user may use a service or may be recommended with a service through audio video navigation (AVN). The processor may arrange application icons so that a service determined to have a high preference level based on preferred service information of the user is positioned at the top on a display provided in the AVN. Whenever the user uses a service, the processor may store a service usage history in the memory.

Referring to FIG. 12, whenever a specific service is used for a specific service through an agent such as Air Conditioner, News, Road Guide, Dance, Call, Radio, etc., the processor may record the number of usages of the specific service. The processor may generate a second ANN model according to pre-recorded/stored information. The second ANN model, which is a customized artificial neural network model, may be referred to as the second ANN model.

The processor may recommend a service to the user based on the preference service information, and update the second ANN model based on the user's reaction or a reward for the service.

Figure 13:
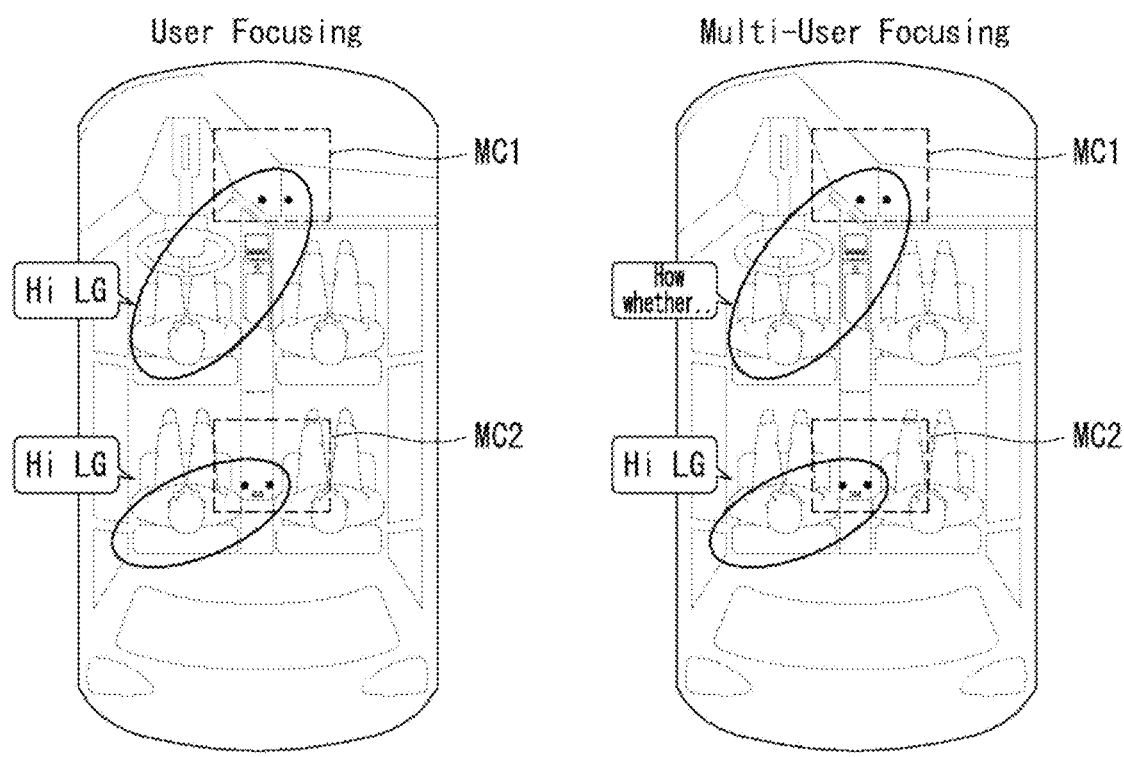

Referring to FIG. 13, the first and second microphone pairs may provide a user with a service not just through a single speech agent, but also through a multi-speech agent.

In the case of Multi-User Focusing, the multi-speech agent may generate a different control signal based on a speech signal of each user acquired by the aforementioned method for separating a speech.

The multi-speech agent may receive speech signals of multiple occupants through Multi-User Focusing and contribute to providing a more convenient service to a user.

Figure 14:
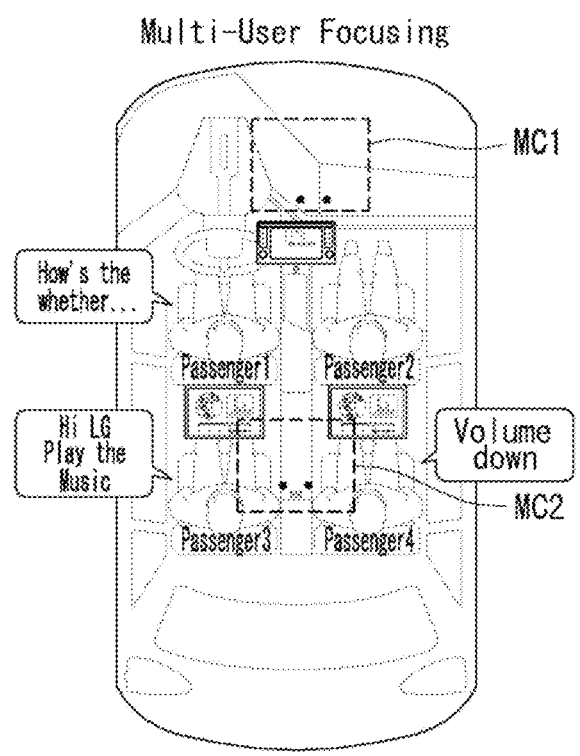

FIG. 14 shows an example in which a first occupant, a second occupant, a third occupant, and a fourth occupant respectively use different services in a vehicle using Multi-User Focusing. The multi-speech agent may provide a weather guide service in response to the first user's utterance "How's the weather . . . ", and may generate a signal for playing music in response to the third occupant's utterance "Hi LG, Play the Music". In addition, the multi-speech agent may generate a signal for lowering volume of a speaker in response the fourth occupant's utterance "Volume Down".

Figure 15:
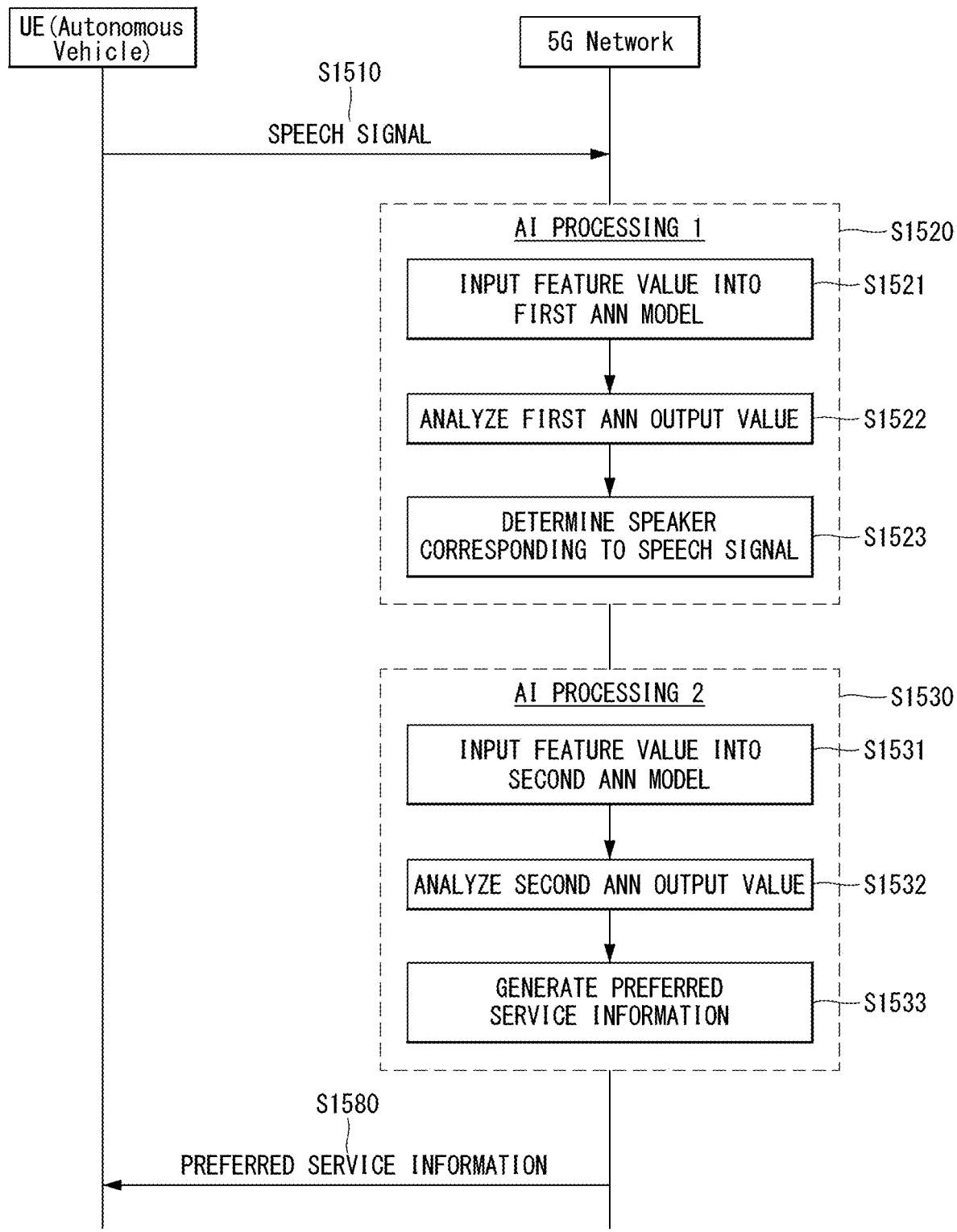
FIG. 15 is a flowchart of an example of performing a method for determining an utterance intent through AI processing of a 5G network.

FIG. 15 is a flowchart of an example of performing a method for determining an utterance intent through AI processing of a 5G network.

Referring to FIG. 15, the processor may control a communication module so that a feature value extracted from a speech signal is transmitted to an AI processor included in the 5G network. In addition, the processor may control the communication module so that AI-processed information is received from the AI processor.

Meanwhile, the processor may perform an initial access procedure with the 5G network in order to transmit a speech signal to the 5G network. The processor may perform the initial access procedure with the 5G network based on a synchronization signal block (SSB).

In addition, the processor may receive, from the network, downlink control information (DCI) that is used for scheduling transmission of a speech signal through the communication module.

The processor may transmit a speech signal or a feature value extracted from the speech signal to the 5G network based on the DCI.

The speech signal or the feature value extracted from the speech signal may be transmitted to the 5G network through a physical uplink shared channel (PUSCH), and the SSB and a demodulation reference signal (DM-RS) of the PUSCH may be quasi-co-located (QCL) with respect to QCL type D.

Referring to FIG. 15, the processor may transmit the speech signal or the feature value extracted from the speech signal to the 5G network through the communication module (S1510).

Here, the 5G network may include an AI processor or an AI system, and the AI system of the 5G network may perform AI processing based on received sensing information (S1520).

The AI system may input feature values received from a device into an ANN model (S1521). The AI system may analyze an ANN output value, and calculate a weight based on the ANN output value (S1522). The 5G network may determine a user based on the weight calculated by the AI system, and generate user information (S1523).

In addition, the 5G network may include an AI processor or an AI system, and the AI system of the 5G network may perform AI processing based on received sensing information (S1530).

The AI system may input feature values received from user information into an ANN model (S1531). The AI system may analyze an ANN output value, and calculate a weight based on the ANN output value (S1532). The 5G network may determine a preferred service based on the weight calculated by the AI system, and generate preferred service information (S1533).

Although the embodiment shown in FIG. 15 is described mainly about an example of an operation performed by the server or the AI processor, the corresponding operation may be performed by a processor of an external device.

Figure 16:
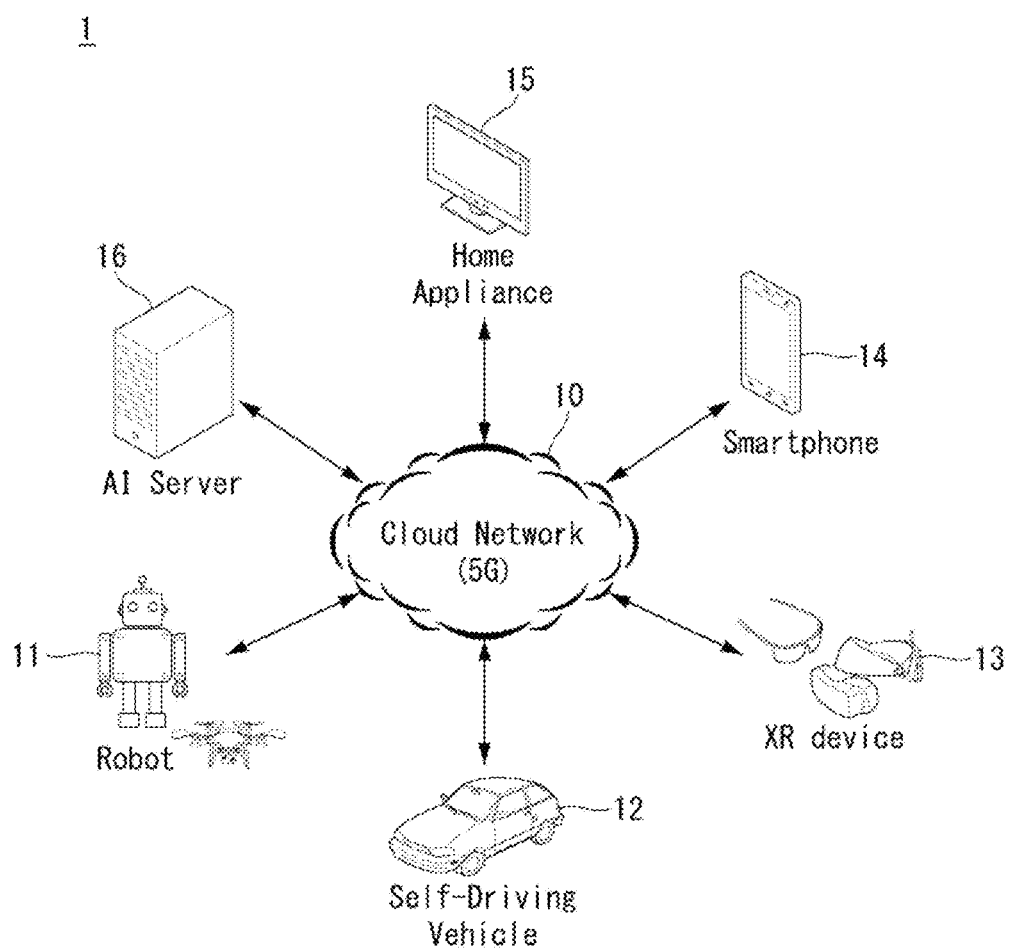
FIG. 16 shows an AI system according to an embodiment of the present disclosure.

FIG. 16 shows an AI system 1 according to an embodiment of the present disclosure.

Referring to FIG. 16, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for separating a speech based on artificial intelligence, the method comprising:
   receiving a speech signal acquired in a vehicle through a microphone;
   determining as to whether a preset wakeup word is included in the speech, by comparing the speech signal with a signal pattern of the preset wakeup word;
   when the preset wakeup word is included in the speech, activating a speech recognition function and forming a cluster of the speech signal;
   detecting a user corresponding to the cluster of the speech signal; and
   retrieving user information of the detected user, and generating preferred service information according to the retrieved user information, wherein the preferred service information is generated by inputting the retrieved user information into a pre-trained artificial neural network (ANN) model and according to an output value of the pre-trained ANN model, wherein the pre-trained ANN model assigns a weight in proportion of a number of usages of the service based on a service usage history of the user,
   wherein the speech signal is a signal that is separated using at least one of sound beam-forming or source separation.

2. The method of claim 1, wherein the cluster of the speech signal is a cluster that is deep-clustered using a pre-trained another ANN model.

3. The method of claim 1, wherein the user information comprises a service usage history of the user.

4. The method of claim 1, wherein the pre-trained ANN model is an ANN model that is supervised by setting the preference service information of the user as training data.

5. The method of claim 1, further comprising performing reinforcement learning of the pre-trained ANN model;
   wherein the reinforcement learning is learning for assigning a reward to the pre-trained ANN model in response to the response of the user with respect to the preferred service information.

6. The method of claim 1, further comprising:
   determining a seat position of the user in the vehicle; and
   setting a desired directional characteristic of beamforming according to the determined seat position.

7. The method of claim 6, wherein the seat position is predicted based on a seating signal output from a sensor provided in a seat of the vehicle.

8. The method of claim 1, wherein the microphone is a beamforming microphone.

9. The method of claim 1, further comprising receiving, from a network, downlink control information (DCI) that is used for scheduling transmission of sensing information, which is related to the user, acquired from at least one sensor provided in the vehicle,
   wherein the sensing information related to the user is transmitted to the network based on the DCI.

10. The method of claim 9, further comprising performing an initial access procedure with the network based on a synchronization signal block (SSB),
    wherein the sensing information related to the user is transmitted to the network through a physical uplink shared channel (PUSCH), and
    wherein the SSB and a demodulation reference signal (DM-RS) of the PUSCH is quasi-co-located (QCL) with respect to QCL type D.

11. A method for separating a speech based on artificial intelligence, the method comprising;
    acquiring a speech signal in a vehicle through a microphone;
    determining as to whether a preset wakeup word is included in the speech, by comparing the speech signal with a signal pattern of the preset wakeup word;
    when the preset wakeup word is included in the speech, activating a speech recognition function and forming a cluster of the speech signal;
    detecting a user corresponding to the cluster of the speech signal; and
    receiving user information of the detected user from an external server, and generating preferred service information according to the received user information, wherein the preferred service information is generated by inputting the received user information into a pre-trained artificial neural network (ANN) model and according to an output value of the pre-trained ANN model, wherein the pre-trained ANN model assigns a weight in proportion of a number of usages of the service based on a service usage history of the user,
    wherein the speech signal is a signal that is separated using at least one of sound beam-forming or source separation.

12. The method of claim 11, wherein the cluster of the speech signal is a cluster that is deep-clustered using a pre-trained another ANN model.

13. The method of claim 11, wherein the user information comprises a service usage history of the user.

14. The method of claim 11, wherein a second ANN model is an artificial neural network model that is supervised by setting the preference service information of the user as training data.

15. The method of claim 11, further comprising performing reinforcement learning of the pre-trained ANN model;
   wherein the reinforcement learning is learning for assigning a reward to the pre-trained ANN model in response to the response of the user with respect to the preferred service information.

16. A device for separating a speech based on artificial intelligence, the device comprising:
   a microphone configured to acquire a speech signal in a vehicle;
   a receiver configured to receive user information from an external server; and
   a processor configured to determine whether a preset wakeup word is included in the speech by comparing the speech signal with a signal pattern of the preset wakeup word, when the wakeup word is included in the speech, activate a speech recognition function, form a cluster of the speech signal, detect a user corresponding to the cluster of the speech signal, and generate preferred service information according to user information of the detected user, which is received through a communication module, wherein the preferred service information is generated by inputting the user information into a pre-trained artificial neural network (ANN) model and according to an output value of the pre-trained ANN model, wherein the pre-trained ANN model assigns a weight in proportion of a number of usages of the service based on a service usage history of the user,
   wherein the speech signal is a signal that is separated using at least one of sound beam-forming or source separation.

* * * * *